Feb. 28, 1933.  C. W. RICE  1,899,826
VALVE MOUNTING MEANS FOR BLOWDOWN CONTROL
Original Filed July 23, 1928  2 Sheets-Sheet 1
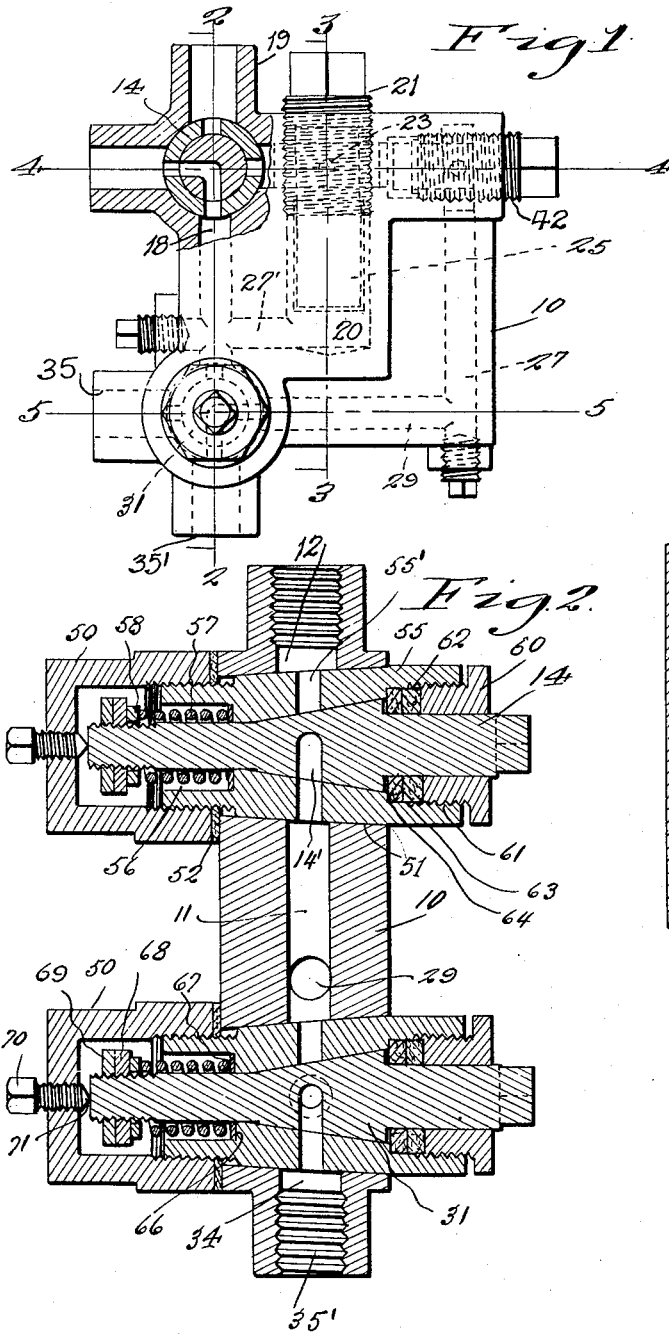
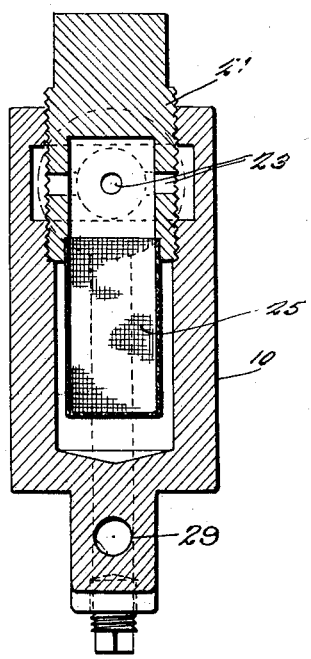
Inventor
C. W. Rice.
By Victor J. Evans
Attorney
R. A. Thomas
Witness Feb. 28, 1933.   C. W. RICE   1,899,826
VALVE MOUNTING MEANS FOR BLOWDOWN CONTROL
Original Filed July 23, 1928   2 Sheets-Sheet 2
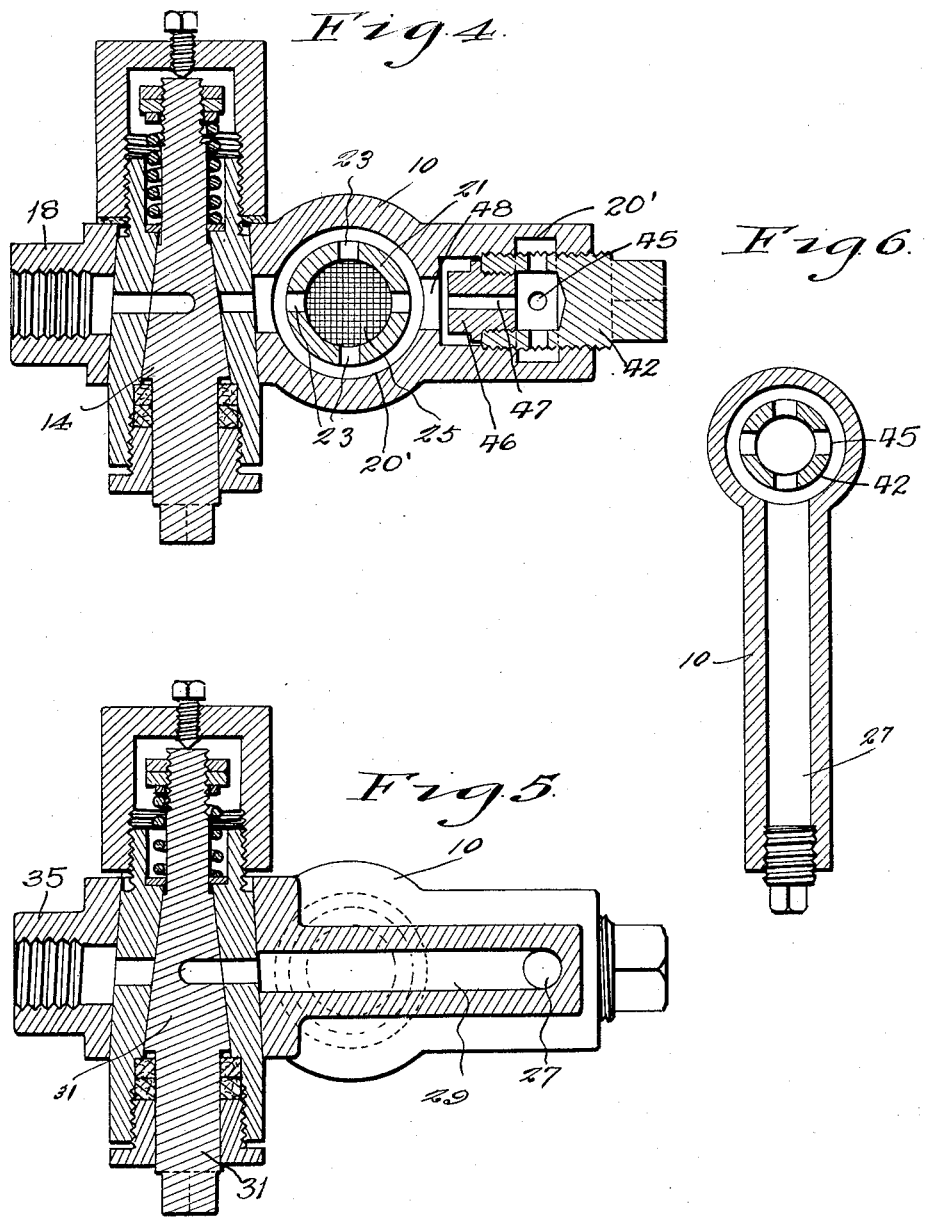

Patented Feb. 28, 1933

1,899,826

UNITED STATES PATENT OFFICE

CYRUS WILLIAM RICE, OF PITTSBURGH, PENNSYLVANIA

VALVE MOUNTING MEANS FOR BLOWDOWN CONTROL

Application filed July 23, 1928, Serial No. 294,641. Renewed August 3, 1932.

The object of this invention is to provide for the easy removal of valves of the type employed in a control apparatus for blowdown water disclosed in my U. S. application for patent, Serial No. 209,594.

A further object is to provide a housing or casing having bores and ducts therein, and having bores for mounting the valve member or members, these bores being adapted to receive removable valve seats or sleeves, the sleeves themselves having longitudinally tapered bores in which the valve elements, also tapered, are positioned.

A further object is to provide for the correct positioning of the tapered elements, longitudinally, in order to afford registration between the transverse ports referred to below, and for other purposes, and to provide internally threaded mounting elements and devices associated therewith for adjusting and resiliently retaining certain of the elements, in the manner disclosed below.

With the foregoing and other objects in view, the invention consists in the novel construction and arrangement of elements described, illustrated and claimed, it being understood that modifications may be made within the scope of the claims without departing from the spirit of the invention.

In the drawings, Figure 1 shows the device in elevation, with a portion broken away; Figure 2 is a section on line 2—2 of Figure 1; Figure 3 is a section on line 3—3 of Figure 1; Figure 4 is a section on line 4—4 of Figure 1; Figure 5 is a section on line 5—5 of Figure 1; Figure 6 is a vertical section through the right hand portion of the structure of Figure 1 and through element 42. The views in section are on an enlarged scale.

In the case above referred to by serial number, a main casing or housing is designated 10, and is provided with a plurality of bores, ducts, and ports which are there described in approximately the following language.

The device is adapted to wash pipe 19, or its contents, back to the boiler, by passing water from pipe 18, carrying water under pressure, thru valve 14, and thru the ports leading therefrom to said pipe 19. The device is also adapted to wash out strainer 25 by passing water from pipe 18 thru valve 14 and the ports or the like communicating therewith, thru port 23 in plug 21, thence thru strainer 25, channel 27, port 29, thru the ports leading thru valve 31, to channel 34, and pipe 35' or pipe 35. Fluid may also be directed thru blowdown pipe 19, valve 14, channel 11, channel 27', chamber 20, strainer 25, port 23, annular chamber 20', bore 48, to bore 47 of plug 46, and thence thru port 45 of plug 42, thru channel 27, valve 31, pipe 35', to a main continuous blowdown pipe.

Water for testing purposes may be drawn off at 35, by passing blowdown water from pipe 19, thru valve 14, channel 11, port 29, valve 31, to pipe 35.

In the case above referred to, it was the intention to screw the sleeve in which the valves are mounted into the casing 10, but in order to permit of renewal or repair, I have in the present case, provided a cap nut designated 50, this element being internally threaded and adapted to engage the threaded end of the sleeve to which it is applied, for the purpose of retaining said sleeve in the housing 10. Under these conditions it is of course necessary or desirable to taper the transverse bore in which the sleeve is mounted, and this taper is shown at 51, and the sleeve is drawn to a tight fit within the tapered bore when the nut 50 engages the washer 52 abutting the outer surface of casing 10. The sleeve is designated 55 and is provided with a chamber or enlarged bore 56 adapted to receive a spring 57 against which a washer 58 abuts.

The valve 14 includes the tapered middle portion having a port 14' therein, adapted to register with any of the ports 55' of the sleeve. These ports just referred to are in communication with the bores 11 and 12 of the main casing 10, and the port 14' of the valve may be placed in communication with either of said bores 11 and 12.

A packing gland 60 is threaded into the sleeve 55, as shown at 61, and bears on packing elements such as 62, the latter, or one of said elements 62, abutting shoulder 63 on the valve, and also abutting shoulder 64 in the sleeve. The shoulder 66 in the sleeve may carry a washer 67, between the shoulder and the spring 57.

In order to provide relative adjustment between the movable elements, a nut 68, and a jam nut 69 are employed, and are threaded on to the smaller end of the valve member 14.

In order to prevent sticking between the sleeve and the valve 14, an adjusting screw 70 is threaded thru the outer end of cap nut 50, and the reduced end 71 of the screw 70 abuts the end of valve member 14.

In view of this arrangement, it will be observed that the removal of the nut 50 permits of the immediate removal of the sleeve 55 with the valve member 14, or the independent removal of valve 14. The valves may therefore be kept in good condition with a minimum expenditure of time and labor.

What is claimed is:—

1. In valve mounting means, a casing having a bore therein, a sleeve projecting into the bore, said sleeve having an enlarged inner diameter near one end portion, there being a threaded chambered element engaging the other end of the sleeve and adapted to bear on the housing, a valve member within the sleeve and projecting into the chambered element, and retaining and adjusting devices operable independently and respectively from within and without the chambered element for securing the valve member in position with reference to the sleeve.

2. In valve mounting means, a casing having a bore therein, a tapered sleeve projecting thru the bore, said sleeve having ports therein, a tapered valve member within the sleeve, the valve member having a port for registration with the ports first named, a cap nut engaging the outer end of the sleeve and the outer wall of the casing, means including a resilient element permitting longitudinal adjustment between the sleeve and valve member, and independent means for forcibly imparting slight longitudinal thrust to the valve member and determining its position with reference to the sleeve and cap nut.

3. A valve and mounting means therefor, comprising a tapered valve member, a sleeve having a tapered bore receiving the valve member, said sleeve having an inner annular shoulder and an outer threaded portion, a cap nut engaging the threaded portion, a spring abutting the inner shoulder of the sleeve and surrounding the valve member, adjusting means engaging the valve member and acting to vary the tension of the spring, and an independent adjusting device passing thru the cap nut and engaging the end of the valve member and providing an exterior adjustment for preventing said valve member from becoming bound in the sleeve.

4. In a device of the class described, a valve casing having a bore, a second bore extending across the bore first named, a tapered ported sleeve in the second bore, a resiliently held ported valve in the sleeve, a threaded chambered element inclosing corresponding ends of the sleeve and valve and having adjustable connection with the sleeve, and valve adjusting means including devices at opposite ends of the valve and respectively engaging the sleeve and valve.

In testimony whereof I affix my signature.

CYRUS WILLIAM RICE.